US006585241B1

United States Patent
Hartl et al.

(10) Patent No.: US 6,585,241 B1
(45) Date of Patent: Jul. 1, 2003

(54) DEVICE FOR THE VIBRATION-ABSORBING MOUNTING OF A COMPRESSED-AIR GENERATOR ON A MOUNTING SUPPORT OF A RAIL VEHICLE

(75) Inventors: Michael Hartl, Unterhaching (DE); Frank Meyer, München (DE); Robert Frank, Germering (DE); Markus Ehinger, Unterschleissheim (DE)

(73) Assignee: Knorr-Bremse Systeme Für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/869,071

(22) PCT Filed: Dec. 8, 1999

(86) PCT No.: PCT/EP99/09654

§ 371 (c)(1),
(2), (4) Date: Aug. 9, 2001

(87) PCT Pub. No.: WO00/38967

PCT Pub. Date: Jul. 6, 2000

(30) Foreign Application Priority Data

Dec. 23, 1998 (DE) .......................... 198 59 897

(51) Int. Cl.[7] .............................. F16M 7/00
(52) U.S. Cl. .................. 267/136; 267/33; 267/140.11; 267/140.5; 417/363
(58) Field of Search .................. 267/140.13, 33, 267/152, 292, 151, 136, 140.11, 140.4, 140.5, 140.3; 248/638, 570; 180/312; 417/363

(56) References Cited

U.S. PATENT DOCUMENTS

| 2,322,879 A | * | 6/1943 | Piron ........................... 267/33 |
| 2,356,962 A | * | 8/1944 | Williams ....................... 267/3 |
| 2,482,488 A | * | 9/1949 | Julien ........................... 267/33 |
| 2,906,523 A | * | 9/1959 | Painter ...................... 267/140.3 |
| 3,204,911 A | * | 9/1965 | Lawrence et al. ........... 267/148 |
| 3,270,998 A | * | 9/1966 | Keetch ..................... 267/140.3 |
| 3,883,101 A | * | 5/1975 | Vernier ........................... 248/9 |
| 4,190,227 A | * | 2/1980 | Belfield et al. .............. 248/636 |
| 4,586,689 A | * | 5/1986 | Lantero ....................... 248/570 |
| 4,696,626 A | * | 9/1987 | Hata et al. ................... 417/312 |
| 4,784,585 A | * | 11/1988 | Hata et al. ................... 417/372 |
| 5,132,584 A | * | 7/1992 | Sasamoto et al. .......... 310/68 D |
| 5,219,037 A | * | 6/1993 | Smith et al. ............ 267/140.13 |
| 5,342,179 A | * | 8/1994 | Dreiman ...................... 417/363 |
| 6,079,698 A | * | 6/2000 | Patterson et al. .............. 267/33 |

FOREIGN PATENT DOCUMENTS

JP        358187635 A  * 11/1983  ................. 188/380

* cited by examiner

Primary Examiner—Matthew C. Graham
Assistant Examiner—Mariano Sy
(74) Attorney, Agent, or Firm—Barnes & Thornburg

(57) ABSTRACT

A device for the vibration-absorbing mounting of a compressed-air generator including a first spring element which is mounted on a mounting support. A second spring element is provided on which the compressed-air generator is arranged. One of the two spring elements has a spring rigidity in essentially the vertical direction that is maximally half its spring rigidity in essentially the horizontal direction. The second spring element is arranged in series with the first-spring element. The inventive device reduces the acceleration measured at the bottom of the understructure to values which are at least 30% of the values known from the prior art.

8 Claims, 2 Drawing Sheets

DEVICE FOR THE VIBRATION-ABSORBING MOUNTING OF A COMPRESSED-AIR GENERATOR ON A MOUNTING SUPPORT OF A RAIL VEHICLE

BACKGROUND AND SUMMARY OF THE INVENTION

The present invention relates to a device for the vibration-absorbing mounting of a compressed-air generator on a mounting support of a rail vehicle having a self-supporting structure, which has a first spring element fastened to the mounting support.

Compressed-air generators generate the compressed air required for the operation of a compressed-air brake and other pneumatic devices in rail vehicles. Single-stage or multiple-stage piston-type air compressors, depending on the construction, in addition to generating forces due to gravity and moments of inertia, also generate tangential forces. So far, an insulation of the above-mentioned forces or moments in the horizontal or vertical direction had taken place by the arrangement of elastic mounting devices of the same type on the vehicle structure. The elastic mounting devices consist of a spring element, particularly a rubber spring. However, in view of modern light construction methods in rail vehicle construction with self-supporting structures made of thin sheet metal and aluminum, the demands made on the vibration insulation of the rail vehicle are no longer met by the above-mentioned mounting device. In the case of lightweight understructures, the degree of insulation of conventional mounting devices is insufficient where construction-caused resonances occur on the understructure side.

In view of the above, it is an object of the invention to provide a device for the vibration-absorbing mounting of a compressed-air generator on a mounting support of a rail vehicle, in the case of which a better insulating effect is achieved without considerably increasing the lateral and longitudinal deflections of the compressed-air generator.

This invention is achieved by means of the present invention.

The invention is surprisingly based on the recognition that three conditions must exist for achieving the object to be obtained: First, a second spring element should be provided on which the compressed-air generator is arranged. The second spring element or the first spring element should also have a spring rigidity essentially in the vertical direction which is no more than half as large as its rigidity essentially in the horizontal direction. Finally, the first spring element and the second spring element should be connected in series. This device achieves not only a vibration insulation or vibration absorption which by far exceeds anything known from the prior art, but also avoids that the longitudinal and lateral deflections of the compressed-air system are considerably enlarged during the operation. Measurements have indicated that the acceleration of an understructure of a rail vehicle could be reduced to up to 30% of the values known from the prior art if the first spring element is a rubber element or a rubber composite element and the second spring element is a wire rope spring.

Advantageously, the first spring element and the second spring element can be connected with one another by means of a connection element. This ensures a simple construction of the device according to the invention. In a particularly advantageous manner, the connection element is constructed as a traverse or an adapter plate which act as a damping mass. By means of a variation of the mass of the connection element or of the traverse or of the adapter plate, an additional damping influence on a self-supporting structure equipped with the device according to the invention can be achieved.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
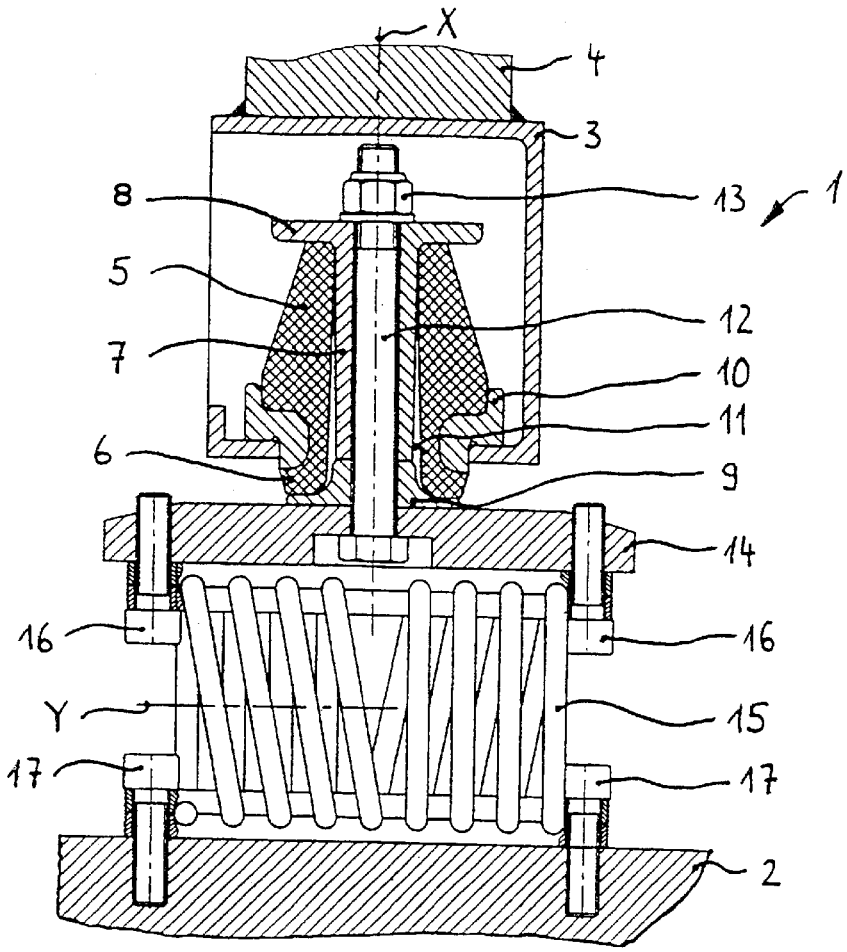
FIG. 1 is a view of a first embodiment of the device according to the invention.

FIG. 1 illustrates a device 1 for the vibration-absorbing mounting of a schematically illustrated compressed-air generator 2 on a mounting support 3 which is also illustrated schematically. In the embodiment illustrated here, the compressed-air generator 2 is a multi-stage piston air compressor. However, this is not absolutely necessary, but a single-stage piston air compressor, a screw-type air compressor or the like can also be provided.

The mounting support 3 is essentially constructed as a U-profile which is fastened on a schematically illustrated part of an understructure bottom 4. On the side facing away from the understructure bottom 4, the mounting support 3 has an opening into which a spring element 5 is inserted. The first spring element 5 is essentially constructed as a hollow truncated cone which is vertically aligned with its longitudinal axis X. The first spring element 5 has a step 6 on its end facing the compressed-air generator 2. The first spring element 5 surrounds a mounting sleeve 7 which, on its end facing the mounting support 3, has a first contact flange 8 and, on its end facing the compressed-air generator 2, has a second contact flange 9 arranged separately on the mounting sleeve 7. The end of the first spring element 5, which is on top in FIG. 1, rests against the first contact flange 8. In the unloaded condition (without the weight of the compressor), the step 6 of the first spring element 5 rests against the second contact flange 9. The mounting of the first spring element 5 in the opening of the mounting support 3 takes place by means of an intermediate ring 10 which, in the area of the step 6, rests against the first spring element 5 and the mounting support 3.

As illustrated in FIG. 1, the first spring element 5 does not rest with its entire length against the mounting sleeve 7. On the contrary, a space 11 is formed between the interior surface of the first spring element 5 and the exterior surface of the mounting element 7. The first spring element 5 can elastically deform in this space 11.

A prestressing of the first spring element 5 will be generated of a screw 12 and a nut 13 mounted thereon. The distance between the first contact flange 8 and the second contact flange 9 is determined by the nut 13. Naturally, it is also possible to construct the distance between the first contact flange 8 and the second contact flange 9—and thus the prestressing upon the first spring element 5—to be changeable by a position change.

Against the first spring element 5, a connection element 14 is also mounted by means of the screw 12 and the nut 13, which connection element 14 comes to rest against the second contact flange 9. The connection element 14 is used for coupling the first spring element 5 to a second spring element 15 which is screwed by means of screws 16 to the intermediate element 14. FIG. 1 shows that the first spring element 5 is constructed as a rubber spring, while the second spring element 15 is designed as a cylindrically developed wire rope spring. However, it is also possible to provide different types of springs.

In the embodiment illustrated here, the longitudinal axis Y of the second spring element 15 is aligned essentially horizontally. As a result, the longitudinal axis X of the first spring element 5 and the longitudinal axis Y of the second spring element 15 are orthogonal with respect to one another. As a result of the design, the first spring element 5 has a rigid construction in the horizontal direction, while the second spring element 15 has a soft construction in the horizontal direction. The spring rigidity of the second spring element 15 is selected such that it is at least by the factor two lower in the vertical direction than in the horizontal direction. As a result, vibrations are surprisingly measured at the understructure bottom 4 whose amplitudes are reduced by up to 30% in comparison the prior art. These are determined not only by the materials and dimensions selected for the first spring element 5 and the second spring element 15 but also by the mass of the connection element 14 which is used as a damping mass for the vibrations. Because of the function of the connection element 14, specifically the direct connection of the second spring element 15 to the first spring element 5, the connection element 14 can also be considered as an adapter plate. Simple screws 17 are sufficient for mounting the compressed-air generator 2 on the second spring element 15.

As illustrated in FIG. 1, the connection element 14 as well as the compressed-air generator 2, including the second spring element 15, hang on the first spring element 5. This arrangement can therefore also be called hanging-hanging.

Figure 2:
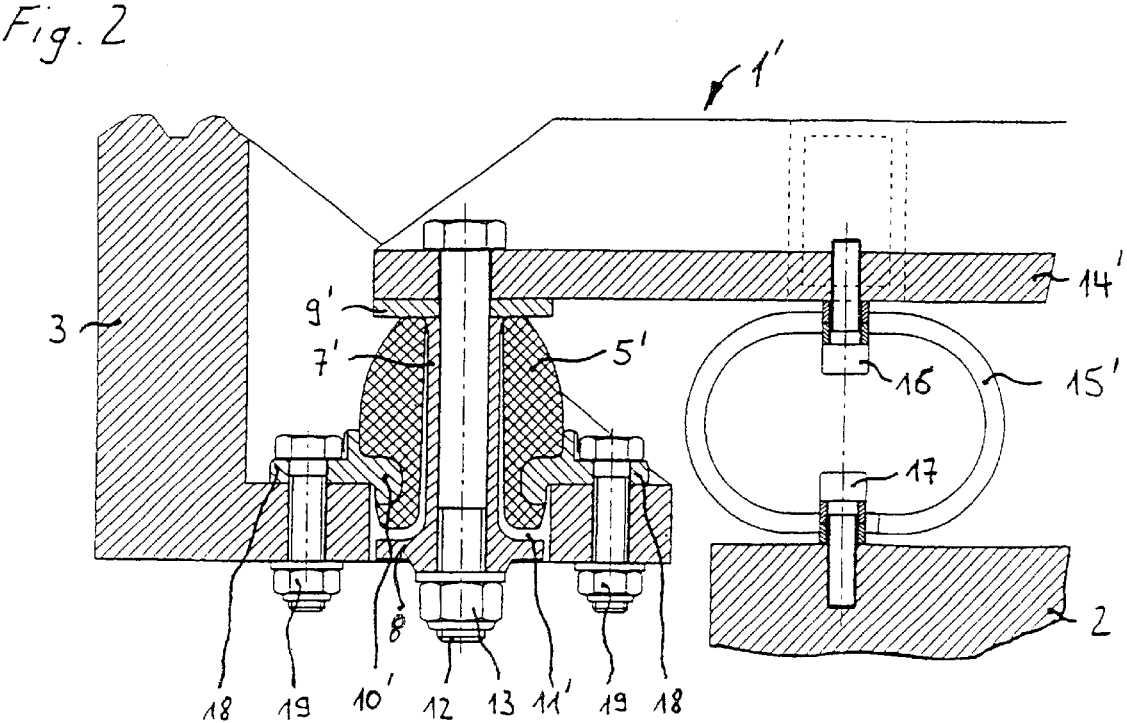
FIG. 2 is a view of a second embodiment of the present invention.

FIG. 2 shows a standing-hanging arrangement, in which an alternatively constructed connection element 14' stands on the first spring element 5', while the second spring element 15 and the compressed-air generator 2 mounted thereon are hanging.

The first spring element 5' illustrated in FIG. 2 is constructed essentially like the first spring element 5 described in FIG. 1. Here also a mounting of the first spring element 5' on the mounting support 3 takes place by means of an intermediate ring 10'. This intermediate ring 10' has flange sections 18 which rest against the mounting support 3. The intermediate ring 10' is fastened to the mounting support 3 by means of screws 19 and pertaining nuts.

Also in the embodiment illustrated here, the first spring element 5' surrounds a mounting sleeve 7' which has a hollow construction. Between the exterior surface of the mounting sleeve 7' and the interior surface of the first spring element 5', a space 11' is also formed which is available as a vibration space for the first spring element 5'. The space 11' is bounded by the contact flange 8, as illustrated with respect to FIG. 1.

A second contact flange 9' rests against the end of the mounting sleeve 7' which is on top in FIG. 2. This contact flange 9' is used as a contact surface of the end of the first spring element 5' which is on top in FIG. 2 and is used for supporting the connection element 14' which is mounted by the screw 12 and the nut 13 on the second contact flange 9' and the mounting sleeve 7'. In the embodiment illustrated here, the connection element 14' is constructed as a hollow rectangular profile, on which a second spring element 15' is mounted by screws 16. Here also, the second spring element 15' is constructed as a spirally designed wire rope spring, while the first spring element 5' is a rubber spring. The compressed-air generator 2 is suspended by screws 17 on the second spring element 15'. With respect to the spring rigidities, the first spring element 5' and the second spring element 15' are dimensioned similar to the first spring element 5 of FIG. 1 and the second spring element 15 of FIG. 1 respectively. Here also, the connection element 14' is used as a damper mass which is constructed in the shape of a traverse element.

Figure 3:
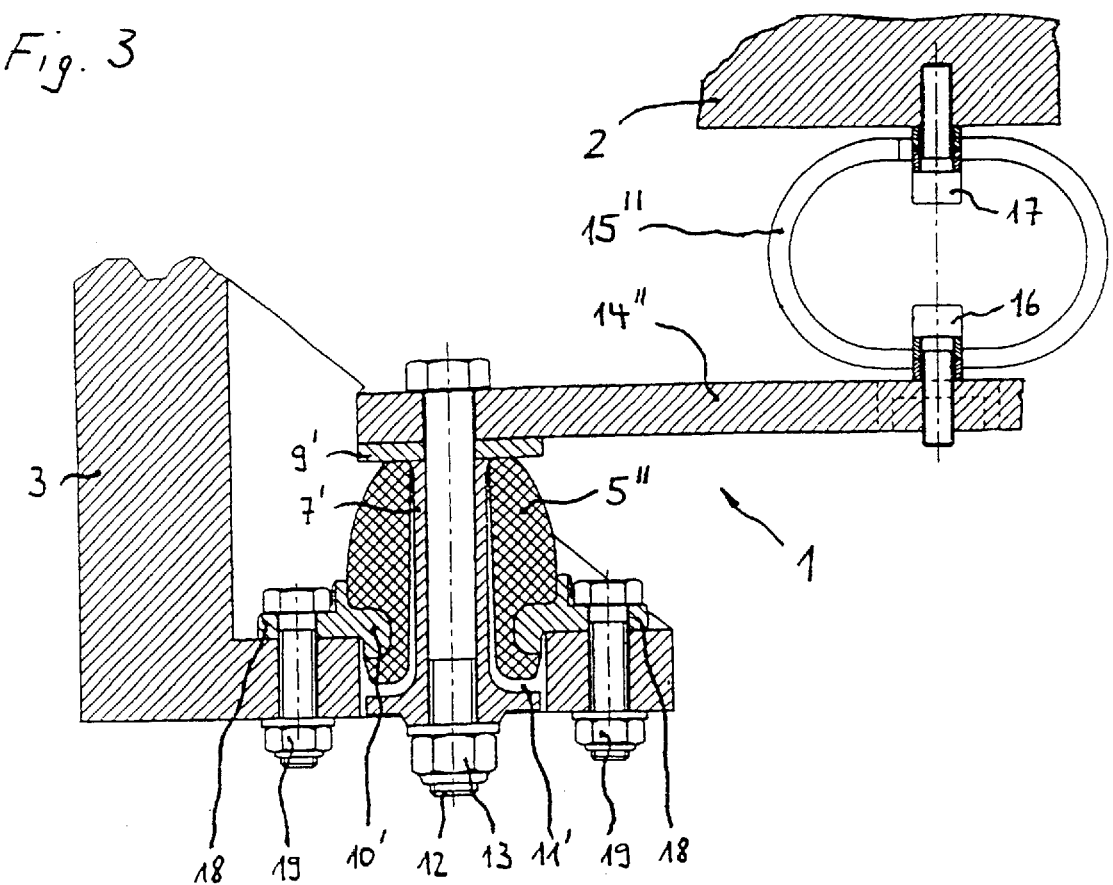
FIG. 3 is a view of a third embodiment of the device according to the invention.
Figure 4:
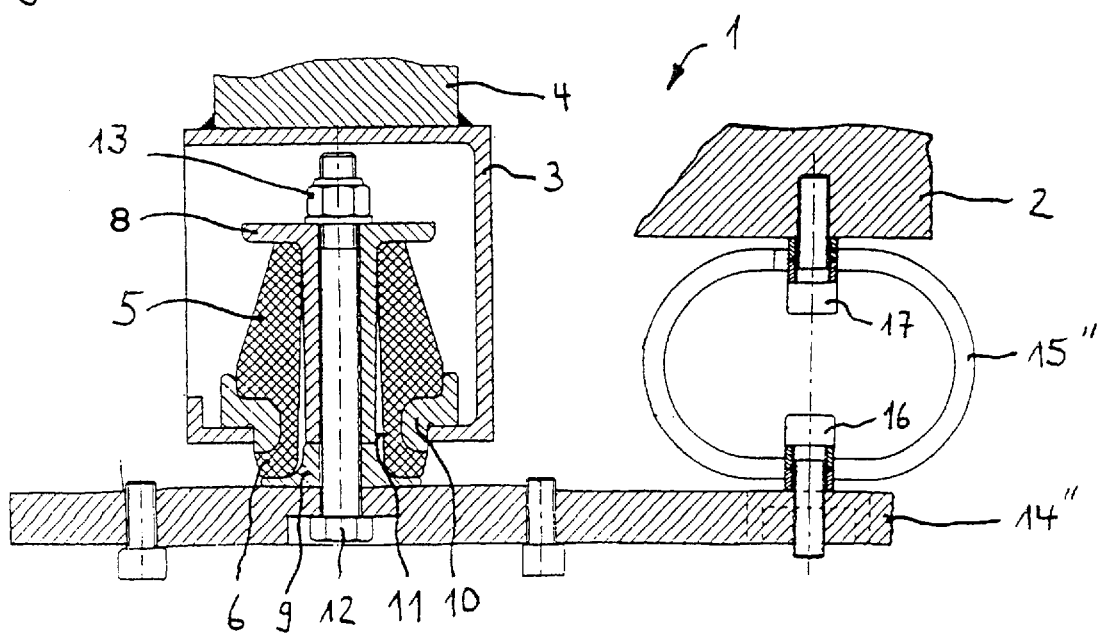
FIG. 4 is a view of a fourth embodiment of the device according to the invention

FIG. 4 finally shows an arrangement of the device according to the invention which can be called a hanging-standing arrangement. In this case, the second connection element 14" hangs on the first spring element 5 which was described in FIG. 1. The compressed-air generator 2 is disposed on the connection element 14" by means of the second spring element 151", as illustrated in FIG. 3.

In FIG. 3, the arrangement of the device according to the invention is illustrated as a standing-standing construction. In this case, the first spring element 5" and the components connected therewith correspond to the first spring element 5' illustrated in FIG. 2 and the components connected therewith. The connection element 14" resting on the second contact flange 9' has a bore on its section which is on the right in FIG. 3. A screw 16 is screwed into the bore for the mounting of a second spring element 15". The second spring element 15" supports the compressed-air generator 2 and is connected with the compressed-air generator 2 by screws 17.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A device for a vibration-absorbing mounting of a compressed-air generator on a mounting support of a rail vehicle, comprising:
    a first spring element being a rubber element or a rubber composite element to be mounted on the mounting support,
    a second spring element being a wire rope spring on which the compressed-air generator is arranged,
    one of the two spring elements having a spring rigidity in an essentially vertical direction which is no more than half as high as its spring rigidity in an essentially horizontal direction, and the second spring element being connected in series with the first spring element.

2. A device according to claim 1, wherein the other spring element has a spring rigidity which, in the horizontal direction, is at the most as large as in the vertical direction.

3. A device according to claim 1, wherein the first spring element and the second spring element are connected with one another by a connection element.

4. A device according to claim 3, wherein the connection element is one of a traverse element and a frame.

5. A device according to claim 3, wherein the connection element is an adapter plate.

6. A device according to claim 3, wherein the connection element is constructed as a damping mass.

7. A device according to claim 1, wherein the first spring element is fastened on the mounting support in one of a hanging manner and a standing manner.

8. A device according to claim 1, wherein the second spring element is mounted on the connection element in one of a hanging manner and a standing manner.

* * * * *